United States Patent [19]
Corbett et al.

[11] 4,325,145
[45] Apr. 13, 1982

[54] THERMAL DETECTION SYSTEM

[76] Inventors: Marshall J. Corbett, 15 Elberta Dr., Northport, N.Y. 11731; Arnold London, 30 Julliard Dr., Plainview, N.Y. 11803

[21] Appl. No.: 894,178

[22] Filed: Apr. 6, 1978

[51] Int. Cl.³ .............................................. H04B 9/00
[52] U.S. Cl. ................................ 455/600; 340/58.1; 340/589; 338/22 R
[58] Field of Search ............... 340/584, 588, 589, 595, 340/596, 597, 598, 599; 338/22 R, 23, 26, 118; 73/362 AR; 244/117 A, 134 R; 250/199; 455/600

[56] References Cited

U.S. PATENT DOCUMENTS

| | | | |
|---|---|---|---|
| 1,165,663 | 12/1915 | Goldberg | 338/15 |
| 2,236,172 | 3/1941 | Gray | 178/6 |
| 2,391,506 | 12/1945 | Pearson | 338/22 R |
| 2,431,899 | 12/1947 | Wolf et al. | 250/41.5 |
| 2,632,885 | 3/1953 | Barclay | 340/599 |
| 2,777,640 | 1/1957 | Kaufman | 236/78 |
| 2,941,192 | 6/1960 | Postal | 340/588 |
| 3,119,070 | 1/1964 | Seliger | 328/114 |
| 3,174,537 | 3/1965 | Meyer | 244/117 A |
| 3,206,832 | 9/1965 | Strother | 338/17 |
| 3,321,630 | 5/1967 | Durig et al. | 250/209 |
| 3,330,942 | 7/1967 | Whitson | 244/134 R |
| 3,493,787 | 2/1970 | Russell | 307/291 |
| 3,541,539 | 11/1970 | Trumble | 340/596 |
| 3,577,193 | 5/1971 | Hutkin | 340/596 |
| 3,634,839 | 1/1972 | Vassil | 340/237 S |
| 3,781,748 | 12/1973 | Bishop et al. | 338/15 |
| 3,807,878 | 4/1974 | Fields | 356/206 |
| 3,810,034 | 5/1974 | Brunsch | 330/59 |
| 3,824,018 | 7/1974 | Crane, Jr. | 356/112 |
| 3,824,018 | 7/1974 | Crane, Jr. | 356/112 |
| 3,860,875 | 1/1975 | Darnell et al. | 328/3 |
| 3,869,666 | 3/1975 | Saltz et al. | 324/76 R |
| 3,871,739 | 3/1975 | Poulson | 350/1 |
| 3,898,605 | 8/1975 | Burns | 338/18 |
| 3,914,667 | 10/1975 | Waldron | 317/36 TD |
| 3,955,292 | 5/1976 | Robertsson | 35/25 |
| 4,037,311 | 7/1977 | Blackman et al. | 29/593 |

OTHER PUBLICATIONS

Duff-Gradient Detection System-IBM Tech. Discl. Bull., vol 18 #12, May 1976, pp. 3978, 3979.
Beardsley-Laser Detection-Perkin-Elmor Technical News, Jul. 1976.

*Primary Examiner*—Joseph A. Orsino, Jr.

[57] ABSTRACT

A thermal detection and alarm system for indicating the irradiation of a surface by a heat source such as a laser beam has been invented. The detector element may form an integral portion of the vehicle's outer surface or may be parasitically mounted thereto. The proposed system is light weight, energy efficient, durable and highly sensitive. The invention is especially suited for use with Boron-Tungsten composite surfaces as found on aircraft and spacecraft.

21 Claims, 8 Drawing Figures

THERMAL DETECTION SYSTEM

BACKGROUND OF THE INVENTION

There are numerous applications in which it is desirable to detect the presence of laser energy. Due to the intensity of this energy, various devices have been proposed. These devices often have application in systems which operate to protect and warn laboratory personnel who function in the vicinity of a laser source. These systems utilize a variety of detection elements including photodetectors, photovoltaic detectors, Golay cell thermocouples, and bolometers. Many of these systems are designed to be light sensitive and to detect laser energy by the particular light characteristics of laser beams. Others are heat sensitive and detect radiation by measuring a temperature-dependent change in resistance.

U.S. Pat. No. 3,898,605 discloses a detection system directed to a temperature sensitive film integral to an infrared waveguide. The system measures changes in resistivity responsive to the heat generated by a parallel beam of laser energy.

U.S. Pat. No. 3,781,748 is directed to a chalcogenide glass bolometer design which utilizes a semiconducting thermistor to indicate the presence of electromagnetic radiation.

While the systems proposed by the prior art have proved satisfactory for some applications, they exhibit shortcomings in various respects. Susceptibility to mechanical damage, difficulty of construction and the necessity of transformer coupling are but some of the limitations which make the prior systems unsuitable for use in a space or military environment.

SUMMARY OF THE INVENTION

The present invention discloses a novel temperature responsive detection system of very light weight and high sensitivity which is capable of withstanding a variety of atmospheric and other deleterious conditions which are inherently characteristic of air and space travel. The system can utilize the outer surfaces of a vehicle as a detector or can incorporate a conformal parasitic skin portion applied to the surface of a vehicle.

One scenario in which the present system may find use is to provide immediate warning of a laser attack or probe on a spacecraft or aircraft. The desirability of determining the presence of a radar interrogation signal is well known and many such systems have been proposed in the prior art. With the advent of laser weaponry and laser ranging techniques, an immediate indication of laser presence may be critical to the survivability of the vehicle irradiated.

The light weight (approximately 0.8 ounces per square foot) and high sensitivity of the present invention make it especially suitable for use in such a military situation. When the temperature detectors form an integral portion of the vehicle surface, the system exhibits a further advantage in that irradiation of any portion of the surface can be detected. The redundancy of active elements (approximately 200 individual circuits per inch) allows the system to operate even when damaged by other threats.

OBJECTS OF THE INVENTION

Accordingly, it is an object of the present invention to provide a novel thermal detection and alarm circuit which indicates the irradiation of a surface by a laser or other heat source.

It is also an object of the present invention to provide a light weight energy efficient thermal detection system capable of withstanding severe environmental conditions.

It is a further object of this invention to provide a novel laser detection system which can be incorporated into the outer surface of a vehicle or can be embodied in a parasitic skin portion specifically applied to the surface of a vehicle.

It is a further object of the present invention to provide a thermal detection system utilizing Boron, or a Boron-Tungsten composite to provide detection of laser energy.

As would be apparent to one skilled in the art, a novel thermal detection system, as is described below, may find use detecting and controlling dangerous and unnatural sources of heat other than lasers. One such application would be to recognize boiler hot spots. More generally, the present invention may be used to cover any area which is susceptible to overheating. This may include dangerous areas of industrial plants, buildings and vehicles. In contrast to present sprinkler system type heat detectors, which are placed only in specific locations, the present detection system can completely cover any potentially hazardous areas. It can also be coupled to existing sprinkler systems and work in conjunction with them.

These and other objects and advantages of the invention will be apparent from the following description and claims, the novelty consisting of the unique construction features, the combination of parts, the relation of the members and the operation thereof, all as more completely outlined herein and particularly pointed out in the appended claims.

DETAILED DESCRIPTION OF THE DRAWINGS

Figure 1:
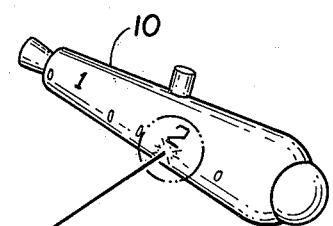
FIG. 1 is an illustration of a laser beam irradiating the surface of a space vehicle.
Figure 2:
FIG. 2 is an enlargement of a section of FIG. 1 showing in detail the impingement of a detector area by a beam of laser energy.
Figure 2:
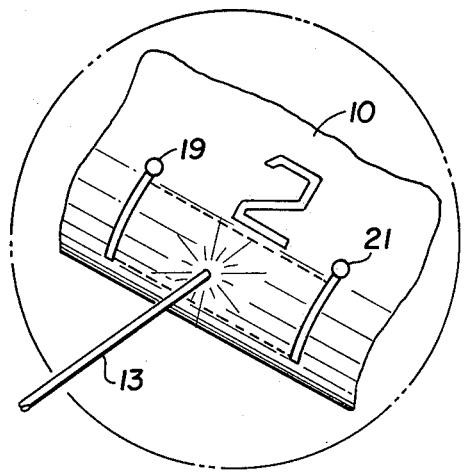

Referring now to the drawings, there is shown in FIG. 1 one exemplary situation wherein the surface of space vehicles 10 in orbit is irradiated by a beam of heat energy 13 generated from a source on earth. FIG. 2 is an enlargement of a section of FIG. 1 showing a portion of the alarm circuitry affected by the beam.

Figure 3:
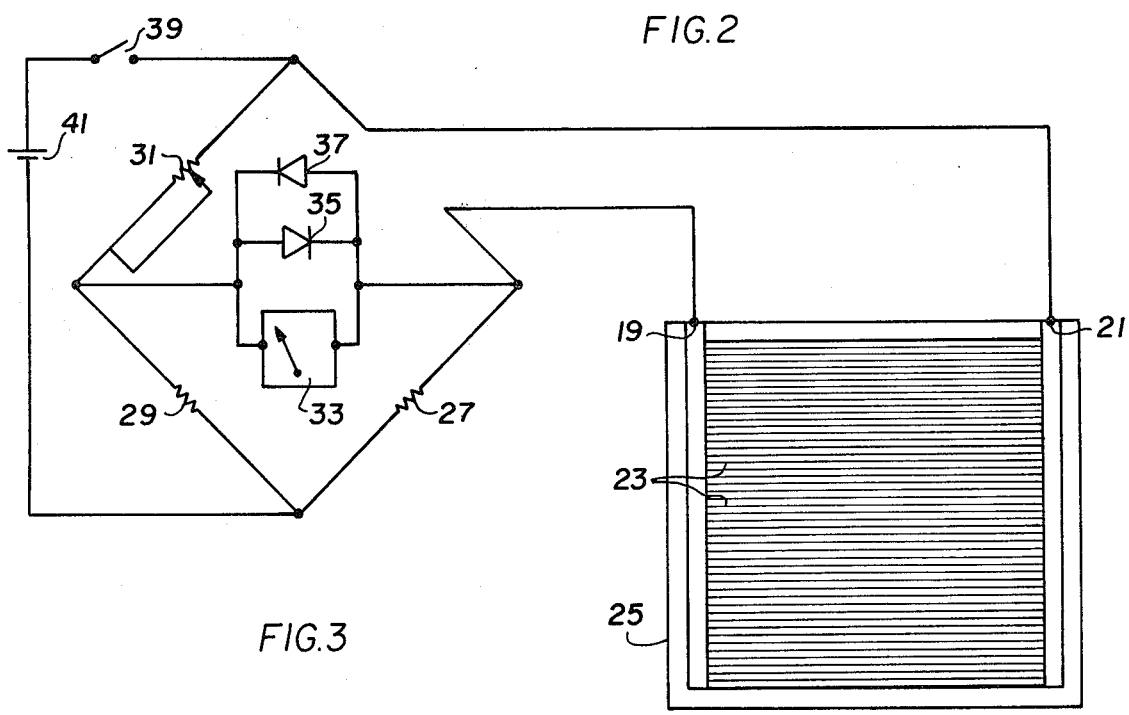
FIG. 3 is an illustration of a Boron laser heat detector and the associated alarm circuitry.

Electrodes 19 and 21 shown also in FIG. 3 may connect Boron wires of 0.004 inch diameter, with a Tungsten or Carbon core. The wires are insulated by a layer of insulating material such as epoxy resin. The wires may be arrayed in a single ply or multiple ply layers which can be bonded to the electrodes with conductive adhesive. Electrodes 19 and 21 may in practice comprise strips of metallic foil.

Boron-Tungsten composites such as are used on the surfaces of spacecraft may be adapted for use as particularly effective detector elements. The electrical resistance of Boron at room temperature is about two million times its resistance at red heat (Lange's Handbook of Chemistry, 1946 edition, p. 62). Therefore, if an electrical potential is placed along a boron wire and the wire is heated, the resistance of the wire drops and the current flow increases.

In the bridge circuit of FIG. 3, heat detector 25 forms a part of a bridge network with resistors 27, 29 and 31. Meter 33 and diodes 35 and 37 are connected across the bridge to indicate a current flow when the effective resistance of detector 25 varies in response to the temperature of Boron wires 23. Switch 39 and power source 41 provide an energy supply.

Figure 4:
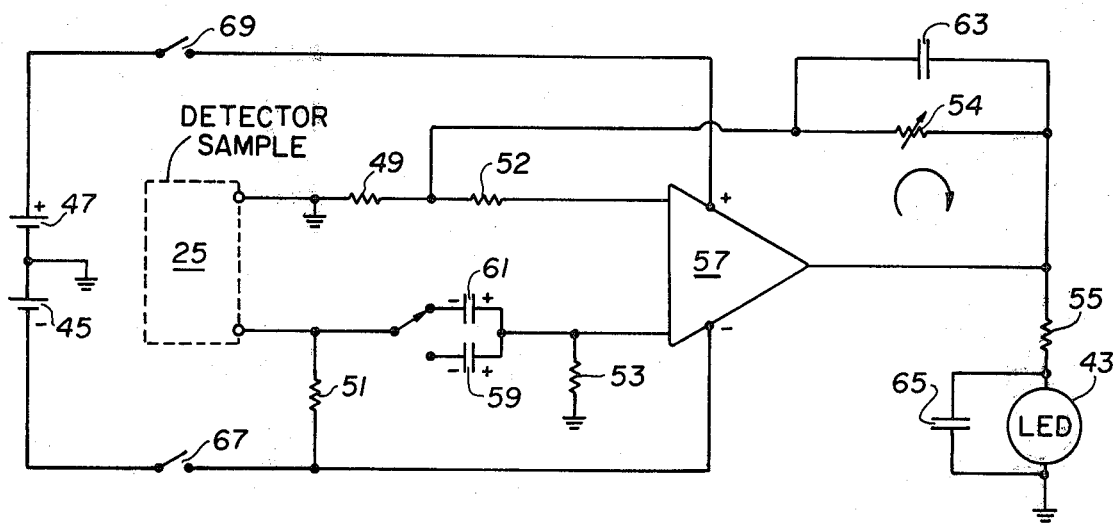
FIG. 4 is an illustration of an alternate alarm circuit for use with the heat detector of FIG. 3.

FIG. 4 illustrates an alternative alarm circuit which can be used in connection with detector 25. Display 43 is illuminated by sources 45 and 47 when Boron detector 25 is heated above ambient temperature. Resistors 49, 51, 52, 54 and 55 effect a threshold level of resistance. Once detector 25 exhibits a resistance below this level, amplifier 57 operates to illuminate the display 53. Capacitors 59 and 61 and resistor 53 are connected to amplifier 57. Capacitors 63 and 65 provide a low resistance path for transient signals. Switches 67 and 69 operate to provide power to the circuit.

Figure 5:
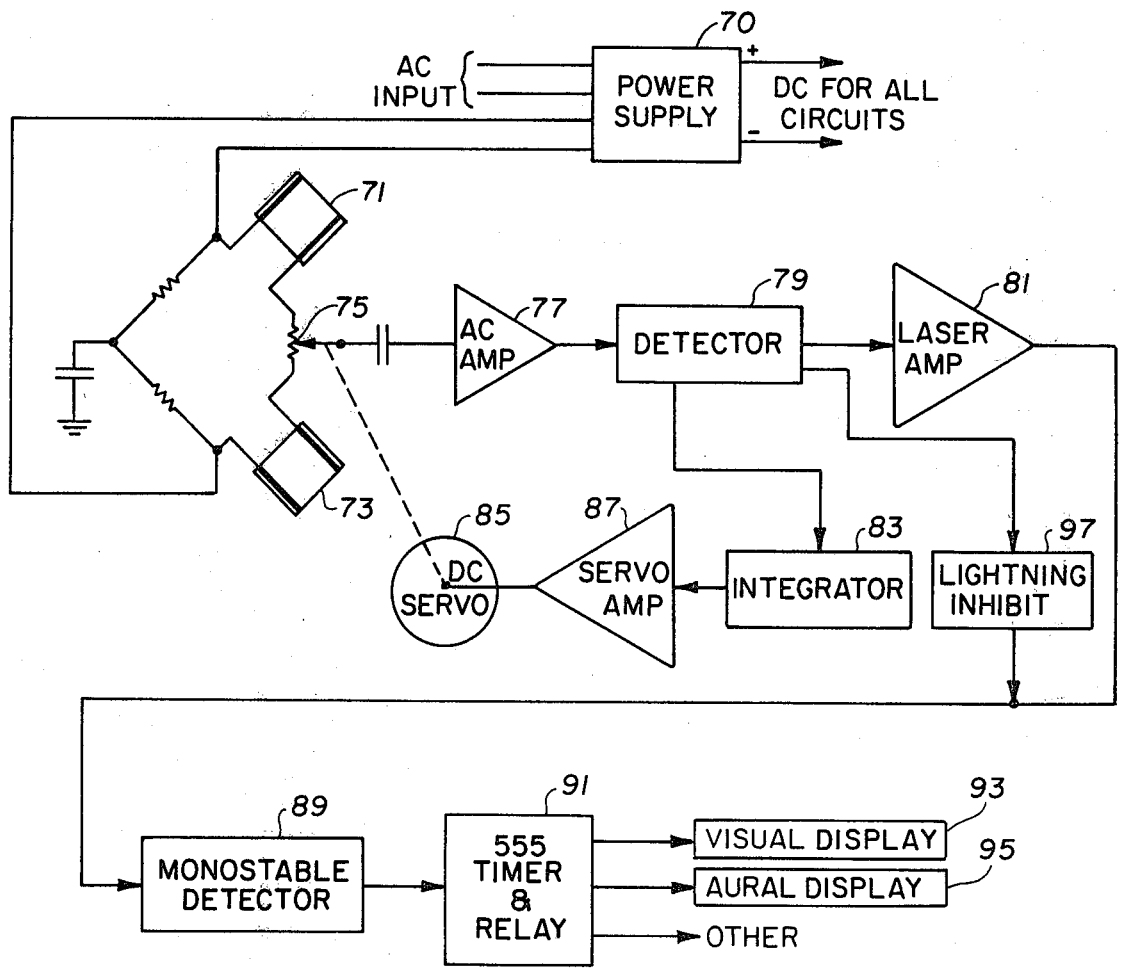
FIG. 5 is a schematic representation of a rate of change of temperature alarm circuit utilizing a differential bridge detector.
Figure 7:
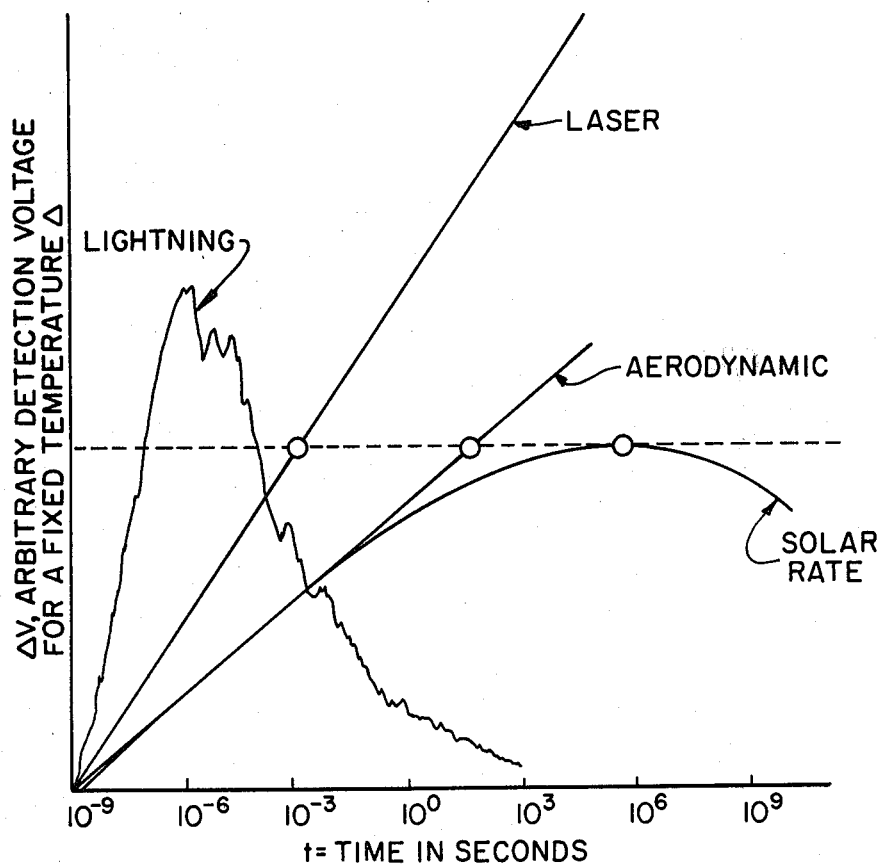
FIG. 7 illustrates detector heating rates resulting from exposure to a variety of heat sources.

FIG. 5 illustrates a rate of change of temperature circuit. In this configuration, the rate of change of temperature is set such that heating of the skin by the sun or by aerodynamic friction cannot cause the detector sample to trigger the alarm circuit. Only a rate of temperature change of the order of hundreds or thousands would typically trigger an alarm indication. The relative rates of temperature change are illustrated in FIG. 7.

The design of FIG. 5 also provides for inhibiting false alarms resulting from such phenomena as nearby lightning, which creates an electromagnetic interference field of even steeper rise time than laser heating. If the signal from the detector has a rise time shorter than a predetermined interval, the system operates to inhibit the detection mode so as to prevent an alarm indication until the transient signal has passed.

Detectors 71 and 73 form each of two arms of an AC bridge circuit. Null potentiometer 75 is driven by a servomotor providing a minimum voltage input to an AC amplifier. The servo loop time constant is very slow (i.e., ten seconds) so that laser heating rates are still detected by aerodynamic and solar heating rates are nulled.

Circuit power supply 70 is adaptable to accept various power sources and provide power to the various circuit circuit devices. AC amplifier 77 provides amplification of the imbalance derived from the differential bridge due to thermal changes.

Detector 79 converts thermally modulated AC signals into equivalent low frequency signals, typically in a 0-10 Hz envelope. Laser amplifier 81 is an ultra low frequency band pass amplifier that amplifies frequencies greater than 10 Hz. An adjustable gain can be provided to set the threshold trigger level for the monostable detector circuit. Integrator 83 is connected to accept all frequencies below 1 Hz and provide an error signal indication in the feedback of the servoloop. The ultra low frequencies are converted to a proportional DC level. Servomotor 85 controls the null position of the wiper of potentiometer 75 at a slow rate as might be characterized by aerodynamic or solar heating. Servo amp 87 provides a signal to control the operation of the DC servomechanism. Monostable detector 89 responds to a positive-going DC level from the laser amplifier and transmits a signal to timer and relay unit 91. The unit accordingly provides an aural and/or visual alarm signal of adjustable duration which is then communicated to an appropriate alarm device such as 93 or 95.

Lightning inhibitor 97 is provided which operates as a high frequency amplifier switch combination to sense transient disturbances, amplify them and switch monostable detector 89 to a low level, thereby inhibiting potential false alarms.

Figure 6:
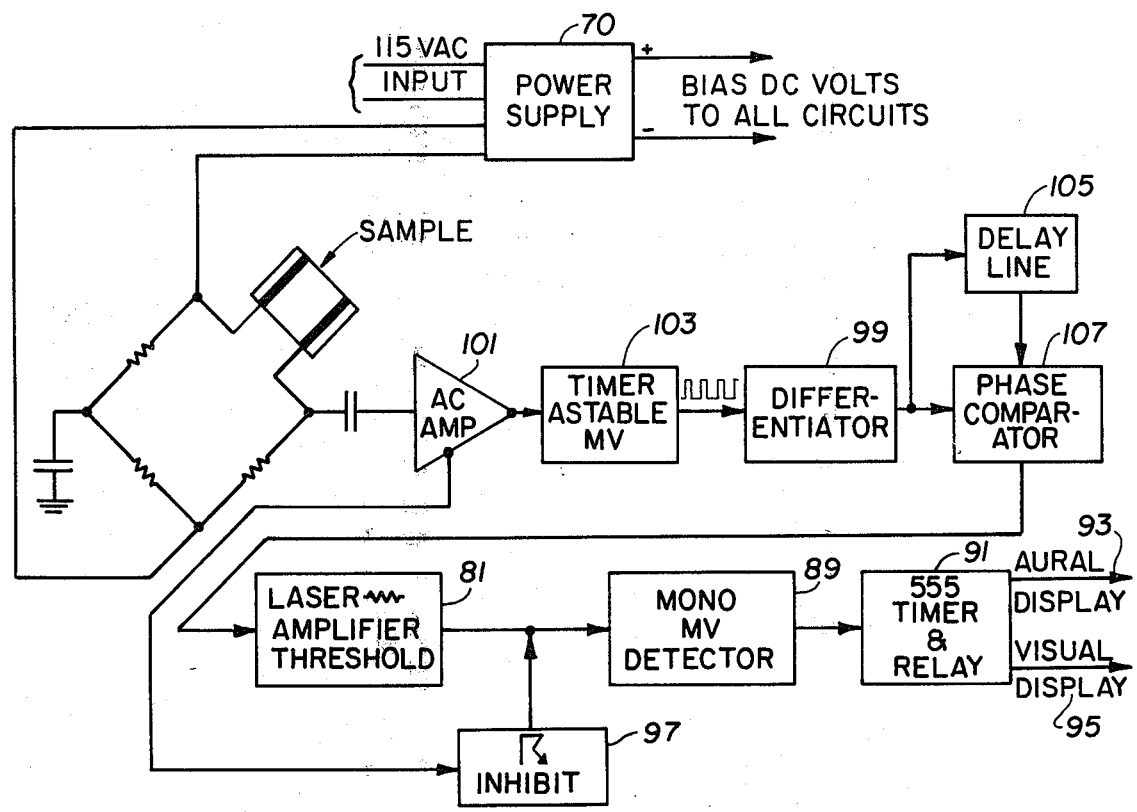
FIG. 6 is a schematic representation of a rate of change of temperature alarm circuit utilizing a simple unbalanced bridge detector.

FIG. 6 illustrates a variation of the rate of change of temperature circuit of FIG. 5. This circuit design employs no servoloop to continually balance the bridge. An AC amplifier 101 amplies all imbalance amplitudes with its output connected to astable multivibrator 103 which provides a variable frequency train of pulses. These pulses are output as symmetrical square waves which are subsequently communicated to a differentiator 99 which then applies the signal to delay line 105 and phase comparator 107. When direct and delayed pulses are phase compared, a reference signal rate is generated which can be used to differentiate between an actual laser indication and a false alarm.

The remaining circuit components function in the same manner as described in connection with FIG. 5.

Figure 8:
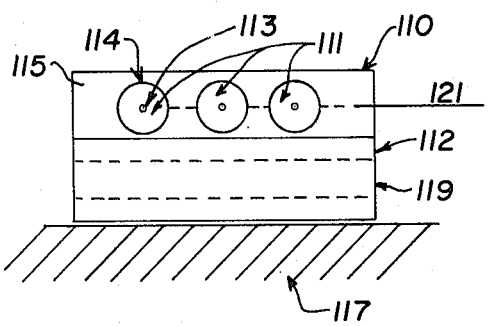
FIG. 8 illustrates the Boron filament plies forming the heat detecting surface.

FIG. 7 illustrates the typical rise times of detection voltages which would be expected from a heat responsive detection circuit when exposed to a variety of heat sources. FIG. 7 presumes an arbitrary detection voltage for a fixed temperature variation to illustrate the differences in heating rates associated with various conditions. FIG. 8 illustrates a plurality of Boron filaments 111 arrayed within a ply 110. Each filament 111 includes a ring of Boron 114 surrounding a supporting core 113 which may be Tungsten or Carbon as previously described. Insulating material 115 encases the filaments to insulate them from electrical contact with each other, or with the ply supporting substrate 117. Ply 112 is shown below ply 110 wherein the Boron filaments 119 are oriented perpendicular to the orientation of filaments 111. Any number of plies may be used depending on the requirements of the particular application. Foil electrode 121, which may be a conductive metallic adhesive, forms an electrical junction with filaments 111 so as to deliver a current flow to the filaments as more fully described in connection with FIGS. 3-6.

While the invention has been described in connection with specific embodiments thereof and in specific uses, various modifications will occur to those skilled in the art without departing from the spirit and scope of the invention as set forth in the appended claims.

What is claimed is:

1. A thermal detection system for indicating the irradiation of a vehicle surface by means of a laser energy beam, the system comprising: a variable conductive heat detector including a plurality of Boron filaments encased in an insulating base forming an integral portion of the outer surface of the vehicle, a system power source electrically connected to said heat detector, temperature indication means connected to said heat detector to detect a change in resistance of said heat detector due to a variation in the temperature of the vehicle's outer surface, a signal generating means to produce an electrical signal responsive to said change in resistance, and, display means activated by said electrical signal to indicate an impingement of a beam of laser energy upon the outer surface of the vehicle.

2. The system as defined in claim 1 wherein said temperature indication means comprises a Wheatstone bridge network connected to said heat detector so as to provide a measurable current flow across said bridge responsive to the temperature of said detector.

3. The system as defined in claim 1 wherein said Boron filaments include a Tungsten core material.

4. The system as defined in claim 1 wherein said Boron filaments include a Carbon core material.

5. The system as defined in claim 1 wherein said display means comprises a visual display device activated in response to said electrical signal.

6. The system as defined in claim 1 wherein said display means comprises an aural indication device actuated in response to said electrical signal.

7. The system as defined in claim 1 wherein said heat detector comprises an insulated single ply layer of Boron filaments encased in an insulating polymeric base and bonded to a substrate as to electrically and thermally isolate said filaments.

8. The system as defined in claim 1 wherein said signal generating means comprises a rate of change of temperature circuit responsive to the rate of variation in the temperature of said detector.

9. The system as defined in claim 8 wherein said signal generating means further comprises filter means to screen out signals responsive to heat from other than a laser source.

10. A thermal detection system for indicating the irradiation of a vehicle surface by means of a laser energy beam, the system comprising: a multiple ply layer of variably conductive Boron filaments encased in an insulating polymeric base and bonded to a substrate as to electrically and thermally isolate said filaments, said layer forming an integral portion of the vehicle outer surface, a system power source electrically connected to said heat detector, temperature indication means connected to said filaments to detect a change in resistance of said filaments due to a variation in the temperature of the vehicle's outer surface, signal generating means to produce an electrical signal responsive to said change in resistance, and, display means activated by said electrical signal to indicate an impingement of a beam of laser energy upon the outer surface of the vehicle.

11. A thermal detection system for indicating the irradiation of a vehicle surface by a beam of laser energy, said system comprising:

a variably conductive heat detection unit integral to the outer load carrying skin of the vehicle, said unit comprising a plurality of Boron filaments with Tungsten cores, said filaments being arrayed in multiple ply layers, and encased in a polymeric base, said base binding said filaments to the vehicle surface while electrically and thermally isolating said filaments, a selectively actuated rate of change of temperature indication means connected to said heat detection unit and operable to detect a change in the electrical resistance of said unit resulting from laser induced variations in the temperature of said unit, signal generating means to produce an electrical signal responsive to said change in electrical resistance, and display means activated by said electrical signal to indicate an impingement of a beam of laser energy upon the outer surface of the vehicle.

12. A variably conductive thermal detection unit comprising a plurality of semiconductive filaments having conductive cores, said filaments being arranged in multiple ply layers, and encased in an insulating base so as to electrically and thermally isolate said filaments, and conductive junction means bonded to said semiconductive filaments so as to provide terminal connections for said unit.

13. A variably conductive thermal detection unit comprising a plurality of Boron filaments having conductive cores, said filaments being arranged in multiple ply layers, and encased in an insulating base so as to electrically and thermally isolate said filaments, and conductive junction means bonded to said Boron filaments as to provide terminal connections for said unit.

14. A variably conductive thermal detection unit comprising a plurality of Boron filaments having conductive cores, said filaments being arranged in multiple ply layers, and encased in an insulating polymeric base so as to electrically and thermally isolate said filaments, and conductive junction means bonded to said Boron filaments as to provide terminal connections for said unit.

15. A thermal detection unit as defined in claim 14 wherein said conductive core is composed of a Carbon material.

16. A thermal detection unit as defined in claim 14 wherein said conductive core is composed of a Tungsten material.

17. A thermal detection unit as defined in claim 14 wherein said junction means comprises a plurality of metallic foils conductively bonded to the surface of said Boron filaments.

18. A variably conductive thermal detection unit comprising a plurality of Boron filaments having a conductive core, said filaments being arrayed in a single ply layer and encased in an insulating polymeric base so as to electrically and thermally isolate said filaments, and conductive junction means bonded to said Boron filaments so as to provide terminal connections for said unit.

19. A thermal detection unit as defined in claim 18 wherein said conductive core is composed of a Carbon material.

20. A thermal detection unit as defined in claim 18 wherein said conductive core is composed of a Tungsten material.

21. A thermal detection unit as defined in claim 18 wherein said junction means comprises a plurality of metallic foils conductively bonded to the surface of said Boron filaments.

* * * * *

UNITED STATES PATENT AND TRADEMARK OFFICE
CERTIFICATE OF CORRECTION

PATENT NO. : 4,325,145
DATED : April 13, 1982
INVENTOR(S) : Marshall J. Corbett and Arnold London It is certified that error appears in the above-identified patent and that said Letters Patent are hereby corrected as shown below:

Cover (ABSTRACT) Page:

Between "[76]" and "[21]" insert --- [73] Assignee: Grumman Aerospace Corporation, Bethpage, N. Y. ---

Between "*Primary Examiner*" and [57]" insert --- *Attorney, Agent or Firm—Richard G. Geib; Bruce B. Brunda*

Column 3:

Line 1; insert after "wires" --- may be arrayed in a single ply or multiple ply layers which ---, and Lines 3 and 4; delete "may be arrayed in a single ply or multiple ply layers which"

Column 4:

Line 65; delete "variable" and insert therefor --- variably ---.

Signed and Sealed this

Twenty-fourth Day of August 1982

[SEAL]

Attest:

GERALD J. MOSSINGHOFF

Attesting Officer          Commissioner of Patents and Trademarks